July 26, 1938.  J. W. MORGAN  2,124,745
MANUFACTURE OF INSULATION FORMS
Original Filed March 22, 1933   2 Sheets-Sheet 1
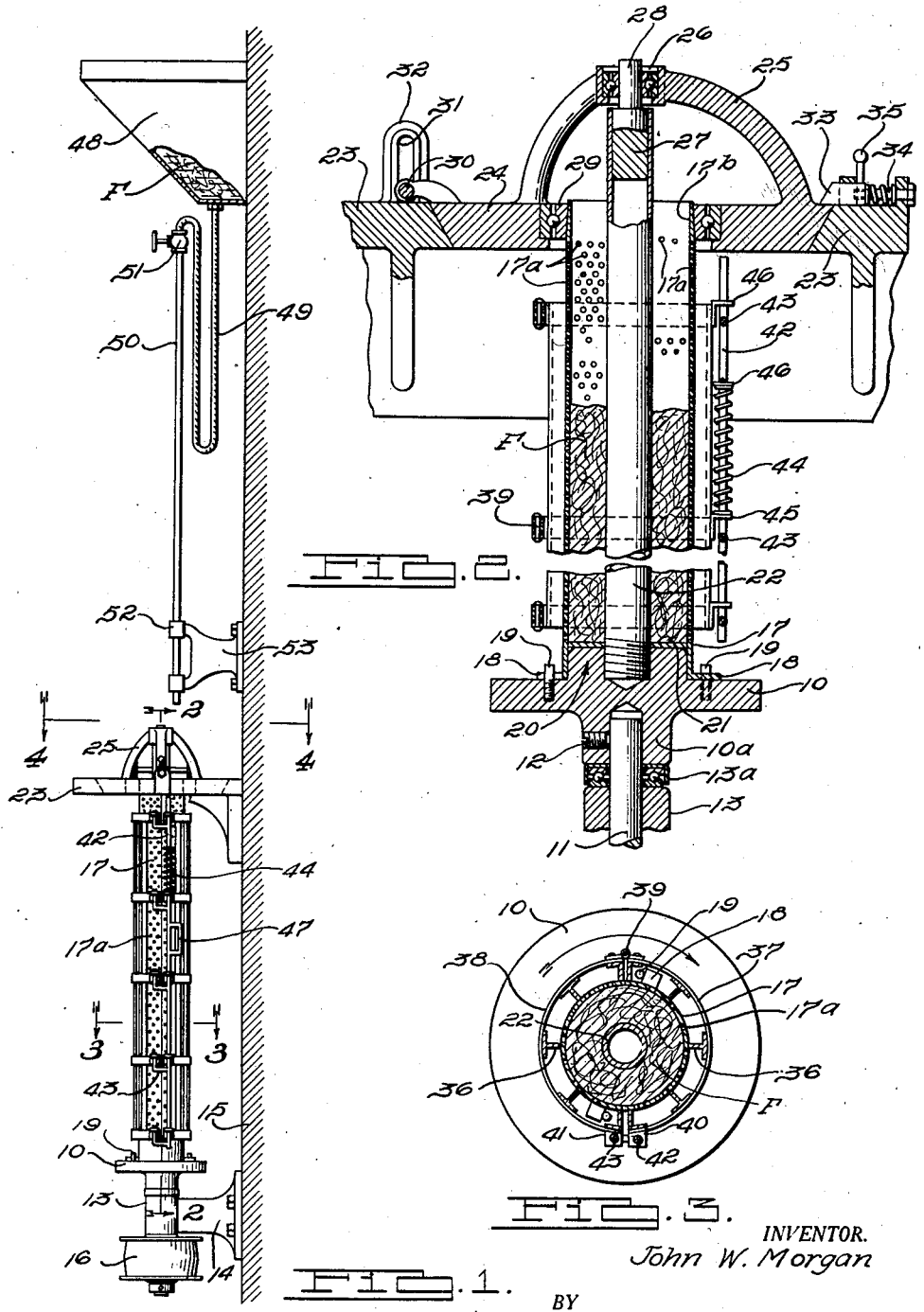
INVENTOR.
John W. Morgan
BY
Dike, Calvert & Gray
ATTORNEYS July 26, 1938.  J. W. MORGAN  2,124,745
MANUFACTURE OF INSULATION FORMS
Original Filed March 22, 1933    2 Sheets-Sheet 2
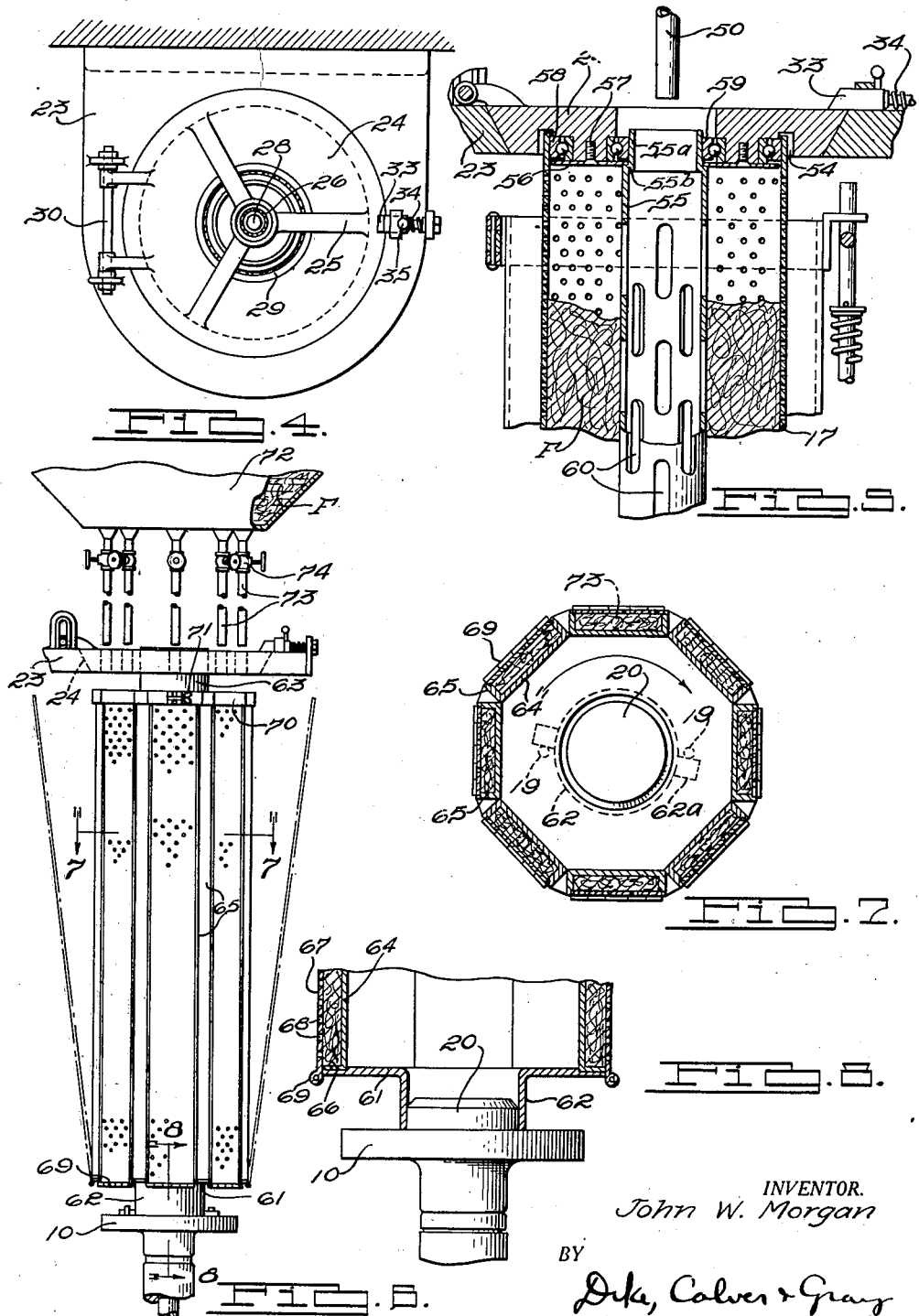
INVENTOR.
John W. Morgan
BY
Dike, Calver & Gray
ATTORNEYS Patented July 26, 1938

2,124,745

UNITED STATES PATENT OFFICE 2,124,745

MANUFACTURE OF INSULATION FORMS

John W. Morgan, Detroit, Mich.

Application March 22, 1933, Serial No. 662,062
Renewed August 29, 1936

2 Claims. (Cl. 92—58)

This invention relates to the manufacture of insulation forms, such as blocks, slabs, concavo-convex sections, particularly adapted for pipe coverings, and other molded forms, composed of moldable material such as mineral or rock wool, asbestos, or any other suitable substance, an object of the invention being to provide improved apparatus for producing insulation or molded forms wherein centrifugal action is utilized in the molding process and wherein the cost of production may be materially reduced while providing a product having superior characteristics.

In accordance with conventional practice in the production of molded insulation blocks or slabs of fibrous material, such as mineral or rock wool, asbestos or the like, which products are particularly useful in connection with coverings for pipes, the fluid mixture is prepared in a hopper or vat comprising a supply of fibrous material, such as mineral or rock wool, suspended in water to which is added a predetermined quantity of binder in powdered form. This mixture is poured into molds, subjected to high pressure so as to produce an initial set and remove a part of the fluid content, and the molded slabs or segments are then baked on drying racks in an oven to eliminate the remaining fluid content. In previous practice the molds are often carried on a travelling turntable and are successively filled from an overhead vat through a valved hopper or supply conduit. The material when molded is subjected to horizontal pressure and the surplus mixture squeezed out. This surplus flows into a catch basin and then is pumped back into the overhead vat. The molded sections are removed from the molds and introduced into the oven where they are subjected to a temperature around 450° F. for a period of time approximating thirty hours.

The heating operation tends to warp the exposed surfaces of the molded section, rendering it irregular while at the same time producing a hard black crust. These crusted surface irregularities have had to be machined off in separate operations to produce smooth surfaces, and, in the case of segmental pipe coverings, to secure the requisite diameter in the central bore. One of the purposes of this extended heating operation is to make the outer portions near the exposed surfaces harder than the inner portions more remote from the heat; but in order to secure a relatively smooth finish it has been necessary to remove at least a portion of this crust.

In accordance with the present method the mineral or rock wool or other suitable material is preferably mixed with water and a suitable binder, preferably in powdered form. The fluid mixture is introduced into a mold having an outer perforated or foraminous surface. In the case of segments for pipe coverings the mold may be a perforated cylinder. The cylinder or other mold is then rotated or spun at high speed, and by centrifugal action the water is extracted from the mixture and the fibrous or other material is caused to felt or pack together in intimate relation with the binder. Where a cylindrical mold is used it is preferred that the mold rotate on a vertical axis, and the filling operation conducted progressively from the bottom towards the top while the mold is being rotated. A filler pipe is introduced into the mold and as the mixture is gradually supplied to the interior of the mold the latter is rotated at high speed. This permits a more uniform mixture of the fibrous material and binder, saves time in manufacture and thus materially reduces the cost.

The felting of the material and elimination of water by virtue of centrifugal action produces a hard packed insulation of very superior texture and superior heat insulating qualities, requiring a drying operation of but several hours at a lower temperature than heretofore. The improved texture of the product is due in part to the agitation resulting from centrifugal action and the felting of the fibers in such manner as to produce a greater number of air cells or voids as compared with previous methods where efficient knitting of the fibers is difficult if not impossible by the use of dies to effect the molding of the material. Moreover, there is no danger, as heretofore, of breaking down the fiber structure as a result of the compressive action of molding dies.

The present invention not only effects great savings in heat and time required for the drying operation, and consequently in labor and equipment costs, but also permits substantial economies in the amount of binder used since less binder is needed because of the better knitting of the fibers and the greater density in the felted product due to agitation and compression caused by centrifugal action. Toughening of the exterior layer has been sought in previous practice by a long baking process which, however, necessitated separate machining operations to produce smooth surfaces. The present method on the other hand produces a substantially smooth exterior surface during the centrifugal molding process, thus eliminating surface machining operations. It produces an outside layer which is materially tougher than the inside layer, a very desirable advantage in providing a more durable and permanent product and in enabling the elimination of protecting jackets or coverings of paper, canvas, or other fiber stock. In conventional practice an inner protecting core of fiber-board is frequently required, this core being cut in half, coated with a suitable cement and then cemented to the bores of the half sections or segments of the molded pipe covering. Such expedients are obviated by virtue of the present invention.

Another feature of the present invention resides in the fact that the centrifugal action forces a greater amount of binder toward the outer surface of the mold, so that in those portions of the molded block requiring greatest strength and hardness, a greater percentage of binder is found. In other words, the outer surface is harder and tougher as a result of the greater density of binder and the closer knitting or felting of the fibers at these regions as a result of centrifugal action.

Other objects of this invention will appear in the following description and appended claims, reference being had to the accompanying drawings forming a part of this specification wherein like reference characters designate corresponding parts in the several views.

Fig. 1 is a side elevation illustrating one form of apparatus for carrying out the present invention.

Fig. 2 is a central vertical section taken substantially through lines 2—2 of Fig. 1 in the direction of the arrows.

Fig. 3 is a horizontal section taken through lines 3—3 of Fig. 1 in the direction of the arrows.

Fig. 4 is a plan view taken from lines 4—4 of Fig. 1.

Fig. 5 is a fragmentary sectional view, somewhat similar in nature to Fig. 2, but illustrating a modification of the apparatus for carrying out the present invention.

Fig. 6 is a front elevation illustrating another form of apparatus for carrying out the invention.

Fig. 7 is a horizontal section taken through lines 7—7 of Fig. 6 in the direction of the arrows.

Fig. 8 is a fragmentary section taken through lines 8—8 of Fig. 6 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated, by way of example, certain forms of apparatus particularly, although not exclusively, adapted for the purpose of carrying out the present process and for producing an improved product in accordance with the invention. In the particular embodiment illustrated in Figs. 1 to 4 inclusive, the apparatus includes a driving plate or disk 10 for rotating or spinning the mold, this disk having a depending hub portion 10a drilled to receive the upper end of a driving shaft 11 which is secured to the driving disk by means of a set screw 12. The shaft 11 revolves within a bearing 13 carried by a bracket 14 bolted to a wall or other suitable fixed support 15. A ball bearing race 13a is interposed between the driving disk 10 and the bearing 13. Secured to the lower end of the shaft 11 is a belt wheel 16 through the medium of which the shaft may be driven from a suitable source of power, it being understood that any suitable prime mover may be employed, such as an electric motor, for driving the disk 10.

Removably mounted upon the driving disk 10 is a cylindrical mold which in the present instance is formed of two semi-circular half sections 17. These sections when closed form a cylinder, the walls of which are perforated at 17a the major part of their effective height or length. The cylindrical mold 17 is formed of suitable metal and the diameter and height thereof are determined by the size of the article to be molded. The lower unperforated edges of the mold sections 17 are provided with projecting lugs 18 adapted to engage driving pins 19 fastened to the driving plate 10, this construction providing a driving connection whereby the mold will be rotated through the medium of the driving disk 10. The disk 10 has a central upstanding cylindrical boss 20 over which fits the lower ends of the mold sections 17, the latter having bottom plate sections 21 resting upon the top face of the boss 20. The mold is also provided with a central core member which is in the form of a metal tube 22 threaded at its lower end into a tapped hole in the boss 20.

The upper end of the mold is supported and properly alined for rotation by means of a fixed bracket 23 secured to the wall or support 15. This bracket has a removable section 24 centrally apertured to receive the upper imperforate end 17b of the cylindrical mold, and is provided with arched spider members 25 forming a bearing to support the upper end of the tubular shaft 22. A plug 27 is fastened by a press fit within the upper end of the tube 22 and has a reduced end portion 28 having a running fit in the bore of the inner member of a ball bearing race 26 carried by the spider members 25. In like manner the upper imperforate end of the mold has a running fit in a ball bearing race 29 carried by the bracket 24. Thus the upper ends of the mold members will be properly supported for rotation while at the same time the section 24 of the bracket may be shifted vertically relatively to the mold members 17 and 22 so as to free the mold sections. This may be accomplished by hinging the bracket section 24 at 30 to the fixed portion 23, the hinge pin 30 having a degree of vertical movement within a slot 31 in the fixed hinge member 32, permitting the hinged section 24 to be shifted vertically and then swung back out of the way. This section may be clamped in position by means of a keeper member 33 and spring actuated locking bolt 34, the latter being released by means of a handle 35.

The perforated walls of the mold sections 17 may be reinforced by means of vertically extending T-bars 36 welded to the mold sections. Suitable clamping members for clamping the mold sections together are provided, and in the present instance these comprise arcuate metallic straps 37 and 38 hinged at 39 at one side of the mold and adapted to be clamped together against the reinforcing bars 36. In the present case the clamping means comprises a pair of angles 40 and 41 welded to the free ends of the clamping straps 37 and 38. The horizontal flanges of the angles 40 have vertically alined holes through which extends a slide rod 42. Fastened at intervals to this rod are angular latch bolts 43 adapted to extend through holes in the horizontal flanges of the angles 41. A compression spring 44 is interposed on the rod 42 between a fixed abutment 45 secured to one of the mold sections and a collar 46 secured to the rod 42. The rod may be shifted by means of a handle 47 so as to force the bolts 43 downwardly out of the apertures in the angles 41, thereby unclamping the mold sections and permitting them to be swung outwardly when it is desired to remove the molded article.

From the foregoing it will be seen that after the molding process the entire support 24 together with bearings 26 and 29 may be shifted from the ends of the cylinder 17 and tube 22 so as to leave the upper end of the mold entirely free. Thereupon the entire mold may be lifted from the driving plate 10 to permit installation of another mold for a succeeding operation. The mold may be readily broken by releasing the locking means 42, 43 and swinging the clamping bands 37 and 38 away from the mold sections.

A fluid mixture F of fiber, water or other liquid and binder is supplied to a vat or other tank 48 from which the mixture flows by gravity through a conduit which in the present instance comprises a flexible section 49 and a rigid section 50 connected together through a suitable coupling having a control valve 51. The pipe section 50 slides vertically through guides 52 carried by a bracket 53, and the construction is such that this pipe may be shifted vertically between the spider arms 25 into the mold 17, there being sufficient space between the tube 22 and the inner wall of the mold to permit the feed pipe 50 to be shifted to a point near the bottom 21 of the mold.

In operation the feed pipe 50 is shifted downwardly into the mold 17 until its lower end is near the bottom of the mold. The driving plate 10 is then rotated at high speed to spin the mold about the common vertical axis of the shaft 11 and bearing end 28 of the tube 22. The control valve 51 is then opened to feed the fibrous mixture into the mold and as the mold is progressively filled the pipe 50 is caused to travel upwardly out of the mold. This operation is preferably accomplished automatically by suitable mechanism and it is also preferred that automatic means be provided for opening the feed valve and starting the rotation of the driving plate when the feed pipe reaches the bottom of the mold and for shutting off the feed when the feed pipe has travelled to the top of the mold where the perforations cease. Thus, as the mold is progressively filled it is at the same time spun, and by centrifugal action the water or other liquid is extracted and driven from the mold through the perforations 17a. The agitation caused by this action produces a very efficient knitting and felting of the fibers and extracts the major part of the fluid from the material. After this is accomplished the molded sections are removed from the mold, placed on a drying rack and baked for several hours in an oven.

In the modification illustrated in Fig. 5, the fibrous material is fed into the mold through the central tubular core 55, this tube 55 corresponding to the tube 22 in the previous embodiment. In this instance the upper imperforate end of the mold sections 17 fit into an annular groove or recess 54 in the removable cover plate 24. This plate or supporting bracket carries an inner ring-like plate 56 secured thereto by screws 57 and adapted to seat on an annular shoulder formed at 55b in the tubular core so as to close the upper end of the mold. The mold sections 17 have a running fit over the outer annular members of a ball bearing race 58 carried by the bracket 24. The upper reduced end 55a of the tube 55 has a running fit in the bore of the inner member of a ball bearing race 59. The tube 55 is provided in its length with sets of feed slots 60, these being arranged in staggered relation so that each slot overlaps the next adjacent slot extending above or below the same.

In operation the feed tube 50 is projected through the tubular core 55 until its lower end extends to the bottom of the mold. The mold is then rotated, material is discharged through the feed tube 50 into the core 55, and the feed tube 50 is progressively elevated as the mold is filled. The mixture will be ejected through the feed slots 60 into the space between the core 55 and the walls of the mold 17, and extraction of water from the material and felting thereof will be obtained as previously described.

In the previous embodiments the method is applied in connection with the formation of concavo-convex insulation sections particularly adapted for pipe coverings. The method is equally applicable for molding the fibrous or other material into a variety of shapes, such as flat slabs or blocks, and accordingly an apparatus is herein illustrated in Figs. 6 to 8 inclusive for carrying out this phase of the invention. The mold may be composed of a series of rectangular mold sections mounted on a common support to provide substantially a multi-sided drum adapted to be spun on a vertical axis. The base of the sectional mold may comprise a disk 61 annularly flanged at 62 to fit over the boss 30 of the driving disk 10. A similar top support 63 may also be provided for the mold, the central annular flange portion thereof being supported within ball bearings carried by the removable bracket section 24 in the manner similar to that illustrated in Fig. 5. As in the previous embodiment the mold has a releasable driving connection with the driving disk 10 through the projections 62a which engage the driving pins 17. A series of rectangular mold sections are supported and clamped in position between the top and bottom members 61 and 63, each mold in the present instance comprising a rear vertical wall 64, side walls 65 and bottom walls 66, the latter fitting into correspondingly shaped recesses or notches in the support 61. The outer side of each mold section is adapted to be closed by means of a hinged plate 67 provided with a series of perforations 68 to permit the water or liquid to be driven out of the material. The removable plates 67 are hinged at their lower edges at 69 to the angular edges of the disk 61, and the upper ends of these hinged plates 67 may be clamped to the upper disk 63 by means of hinged metal retaining straps 70, the free ends of which may be fastened together at 71. The mixture F may be fed from the vat or hopper 72 into the upper open ends of the mold sections 64 through a gang of feed pipes 73 having control valves 74. These pipes may be constructed in a manner similar to that shown in Fig. 1 so as to permit the same to be shifted vertically through holes in the bracket 24 into the molds. After the individual molds have been filled with the fibrous mixture, the driving disk 10 is rotated to spin the series of mold sections as a unit whereby the water or liquid will be driven from each of the sections and a plurality of separate molded articles of the desired shape produced in a single spinning operation. The molded blocks may be removed from the mold sections, the latter being individually removable, and then fed into an oven on drying racks for completion of the drying operation.

I claim:

1. In an apparatus for molding insulation forms or the like composed of moldable material, a mold comprising a pair of semi-cylindrical foraminous walls hinged together, upper and lower members for supporting opposite ends of said mold to rotate about a vertical axis, a vertical spindle extending centrally of said walls and forming a core, and means for rotating said walls and core to effect extraction of water from a fluid mass of material within the mold and to produce a hollow molded form between said core and wall, said upper member having a portion providing a bearing for said walls and a spaced portion slidable on said spindle.

2. In an apparatus for molding insulation forms or the like composed of moldable material, a mold comprising a plurality of separable outer foraminous walls, a rotary driving member detachably connected to the lower end of the mold for spinning the same, a vertical spindle driven by said member and extending centrally of said walls, and a supporting head for the upper end of said walls vertically slidable on said spindle into and out of supporting position with respect to said walls.

JOHN W. MORGAN.